(12) United States Patent
Li

(10) Patent No.: US 12,142,006 B2
(45) Date of Patent: Nov. 12, 2024

(54) DISTORTION CALIBRATION METHOD FOR ULTRA-WIDE ANGLE IMAGING APPARATUS, SYSTEM AND PHOTOGRAPHING DEVICE INCLUDING SAME

(71) Applicant: Black Sesame Technologies Inc., San Jose, CA (US)

(72) Inventor: Wenxue Li, Wuhan (CN)

(73) Assignee: Black Sesame Technologies Inc.

( * ) Notice: Subject to any disclaimer, the term of this patent is extended or adjusted under 35 U.S.C. 154(b) by 413 days.

(21) Appl. No.: 17/582,833

(22) Filed: Jan. 24, 2022

(65) Prior Publication Data
US 2022/0237824 A1     Jul. 28, 2022

(30) Foreign Application Priority Data

Jan. 28, 2021   (CN) .......................... 202110117411.9

(51) Int. Cl.
*G06T 7/80* (2017.01)
*G06T 5/80* (2024.01)
(Continued)

(52) U.S. Cl.
CPC .................. *G06T 7/80* (2017.01); *G06T 5/80* (2024.01); *G06T 7/13* (2017.01); *H04N 23/698* (2023.01); *G06T 2207/20164* (2013.01)

(58) Field of Classification Search
None
See application file for complete search history.

(56) References Cited

U.S. PATENT DOCUMENTS

| 10,922,795 B2 * | 2/2021 | Sun ........................... G06T 5/80 |
| 2015/0254818 A1 * | 9/2015 | Li .............................. G06T 3/02 |
| | | 382/275 |

(Continued)

FOREIGN PATENT DOCUMENTS

| CN | 102750697 A | 10/2012 |
| CN | 103942796 A | 7/2014 |

(Continued)

*Primary Examiner* — Jiangeng Sun
(74) *Attorney, Agent, or Firm* — Timothy T. Wang; Ni, Wang & Massand, PLLC

(57) ABSTRACT

A method for a distortion calibration of ultra-wide angle imaging apparatus is provided. The method includes acquiring calibration images in sample imaging apparatus respectively, measuring corner coordinates using a corner detection algorithm to obtain the predetermined number of sets of corner coordinates for each of the acquired calibration images, inputting the obtained predetermined number of sets of corner coordinates into a selected calibration algorithm model to obtain a set of internal parameters and distortion parameters, and performing an iterative optimization through the selected calibration algorithm to obtain desired internal parameters and distortion parameters for images calibration of the ultra-wide-angle imaging apparatus to be calibrated, by taking the obtained predetermined number of sets of corner coordinates as an input, taking the obtained set of internal parameters and distortion parameters as initial values of optimization variables, and taking an index for evaluating an effect of distortion correction as the minimum.

9 Claims, 9 Drawing Sheets

(51) Int. Cl.
*G06T 7/13* (2017.01)
*H04N 23/698* (2023.01)

(56) References Cited

U.S. PATENT DOCUMENTS

2019/0005680 A1\* 1/2019 Wang .................. G06T 5/80
2020/0342583 A1\* 10/2020 Xue ................... G06T 7/0002

FOREIGN PATENT DOCUMENTS

| CN | 105096329 | A |   | 11/2015 |   |          |
|----|-----------|---|---|---------|---|----------|
| CN | 106960456 | A |   | 7/2017  |   |          |
| CN | 108269289 | A |   | 7/2018  |   |          |
| CN | 108876749 | A |   | 11/2018 |   |          |
| CN | 109242908 | A |   | 1/2019  |   |          |
| CN | 110189382 | A |   | 8/2019  |   |          |
| CN | 110458898 | A | \* | 11/2019 | ............... | G06T 7/80 |
| CN | 111243033 | A |   | 6/2020  |   |          |
| CN | 111429533 | A |   | 7/2020  |   |          |
| CN | 111815710 | A |   | 10/2020 |   |          |
| WO | 2018050223 | A1 |   | 3/2018 |   |          |

\* cited by examiner

DISTORTION CALIBRATION METHOD FOR ULTRA-WIDE ANGLE IMAGING APPARATUS, SYSTEM AND PHOTOGRAPHING DEVICE INCLUDING SAME

CROSS-REFERENCE TO RELATED APPLICATIONS

The application claims priority to Chinese patent application No. 202110117411.9, filed on Jan. 28, 2021, the entire contents of which are incorporated herein by reference.

TECHNICAL FIELD

The present disclosure relates to an image acquisition technology, and more specifically, to a distortion calibration technology of an ultra-wide-angle imaging apparatus.

BACKGROUND

Currently, an ultra-wide-angle camera module is integrated into more and more mobile phones, and the field of view (FOV) of the module is generally greater than 100°, which helps to obtain a wider picture-taking field of view. However, the introduction of ultra-wide-angle camera module also results in an image distortion. In order to eliminate the distortion in the images, the camera module is usually calibrated to obtain the internal parameters and distortion parameters, and then the input images are calibrated to eliminate the distortion in the original image.

The conventional method of distortion calibration is applied on the module of each mobile phones. Internal parameters and distortion parameters are not the same due to the difference of each modules. It is thus necessary to calibrate each module individually to obtain the above information so as to obtain a better distortion calibration effect, which makes the operation complex and the efficiency low.

SUMMARY

In view of this, the present disclosure provides an improved method for distortion calibration of an ultra-wide-angle camera device based on an existing internal reference and distortion parameter acquisition process. The method according to the present disclosure includes: acquiring calibration images in sample imaging apparatus respectively, measuring corner coordinates using a corner detection algorithm to obtain the predetermined number of sets of corner coordinates for each of the acquired calibration images, inputting the obtained predetermined number of sets of corner coordinates into a selected calibration algorithm model to obtain a set of internal parameters and distortion parameters, and performing an iterative optimization through the selected calibration algorithm to obtain desired internal parameters and distortion parameters for images calibration of the ultra-wide-angle imaging apparatus to be calibrated, by taking the obtained predetermined number of sets of corner coordinates as an input, taking the obtained set of internal parameters and distortion parameters as initial values of optimization variables, and taking an index for evaluating an effect of distortion correction as the minimum.

As an example, in the method for distortion calibration of the ultra-wide angle imaging device, the selected calibration algorithm model is the ZHANG's calibration algorithm model.

As an example, the index for evaluating the distortion calibration effect is obtained through: transforming each of the predetermined number of sets of corner coordinates with the obtained set of internal parameters and distortion parameters to obtain a predetermined number of sets of calibrated corner point coordinates, applying a line fitting algorithm on each of the predetermined number of sets of calibrated corner coordinates respectively to obtain a predetermined number of images having a straight line arranged rows and columns, taking intersection coordinates of the rows and columns as updated predetermined number of sets of corner coordinates for each of the predetermined number of images having a straight line arranged rows and columns; and calculating an average value of the pixel Euclidean distance between the predetermined number of sets of corner coordinates and the updated predetermined number of set of corner coordinates and taking the average value as the index for evaluating the effect of distortion calibration.

According to another aspect of the present disclosure, a photographing device including an ultra-wide angle imaging apparatus is also disclosed. The ultra-wide angle imaging apparatus is configured to calibrate photographed images with desired internal references and distortion parameters. The desired internal parameters and distortion parameters are obtained through: obtaining calibration images in each of sample imaging apparatus respectively and the sample imaging apparatus and the ultra-wide angle imaging apparatus are same batch of products and the number of the sample imaging apparatus is a predetermined number; measuring corner coordinates using a corner detection algorithm to obtain a predetermined number of sets of corner coordinates for each of the obtained calibration images, inputting the obtained predetermined number of sets of corner coordinates into a selected calibration algorithm model to obtain a set of internal parameters and distortion parameters and performing an iterative optimization through the selected calibration algorithm to obtain desired internal parameters and distortion parameters for images calibration of the ultra-wide-angle imaging apparatus to be calibrated, by: taking the obtained predetermined number of sets of corner coordinates as an input, taking the obtained set of internal parameters and distortion parameters as initial values of optimization variables, and taking an index for evaluating an effect of distortion correction as the minimum.

As an example, the selected calibration algorithm model is a ZHANG's calibration algorithm model. In addition, by way of example, the index for evaluating the distortion calibration effect is obtained through: transforming each of the predetermined number of sets of corner coordinates with the obtained set of internal parameters and distortion parameters to obtain a predetermined number of sets of calibrated corner point coordinates, applying a line fitting algorithm on each of the predetermined number of sets of calibrated corner coordinates respectively to obtain a predetermined number of images having a straight line arranged rows and columns, taking intersection coordinates of the rows and columns as updated predetermined number of sets of corner coordinates for each of the predetermined number of images having a straight line arranged rows and columns, and calculating an average value of the pixel Euclidean distance between the predetermined number of sets of corner coordinates and the updated predetermined number of set of corner coordinates and taking the average value as the index for evaluating the effect of distortion calibration.

In the present disclosure, a distortion calibration device of ultra-wide angle imaging apparatus is also disclosed. The device includes a processor and a memory. Instructions are stored in the memory and the method described is implemented when the instructions are executed by the processor.

The present disclosure also provides a distortion calibration system of ultra-wide angle imaging apparatus. The system includes an acquisition unit configured to acquire calibration images in each of sample imaging apparatus and the sample imaging apparatus have predetermined number, a detection unit for measuring corner coordinates using a corner detection algorithm for each acquired calibration images to obtain a predetermined number of sets of corner coordinates, and a selected model configured to: receive the obtained predetermined number of sets of corner point coordinates from the detection unit and output a set of internal parameters and distortion parameters; perform an iterative optimization through the selected calibration algorithm to obtain desired internal parameters and distortion parameters for images calibration of the ultra-wide-angle imaging apparatus to be calibrated, by: taking the obtained predetermined number of sets of corner coordinates as an input, taking the obtained set of internal parameters and distortion parameters as initial values of optimization variables, and taking an index for evaluating an effect of distortion correction as the minimum.

For example, in the distortion calibration system of the ultra-wide angle imaging system, the selected model is a ZHANG's calibration algorithm model.

Illustratively, in the distortion calibration system of the ultra-wide angle imaging device, the selected model is configured to: transform each of the predetermined number of sets of corner coordinates with the obtained set of internal parameters and distortion parameters to obtain a predetermined number of sets of calibrated corner point coordinates, apply a line fitting algorithm on each of the predetermined number of sets of calibrated corner coordinates respectively to obtain a predetermined number of images having a straight line arranged rows and columns, take intersection coordinates of the rows and columns as updated predetermined number of sets of corner coordinates for each of the predetermined number of images having a straight line arranged rows and columns, and calculate an average value of the pixel Euclidean distance between the predetermined number of sets of corner coordinates and the updated predetermined number of set of corner coordinates and taking the average value as the index for evaluating the effect of distortion calibration.

DETAILED DESCRIPTION OF THE EMBODIMENTS

In order to make the above-mentioned objects, features and advantages of the present disclosure clearer, specific embodiments of the present disclosure will be described in detail with reference to the accompanying drawings. In the following description, numerous specific details are set forth in order to provide a thorough understanding of the present disclosure. The invention can be embodied in many other ways than those described herein, and those skilled in the art can make similar modifications without departing from the spirit of the invention. The invention is therefore not limited by the specific embodiments disclosed below.

Figure 1:
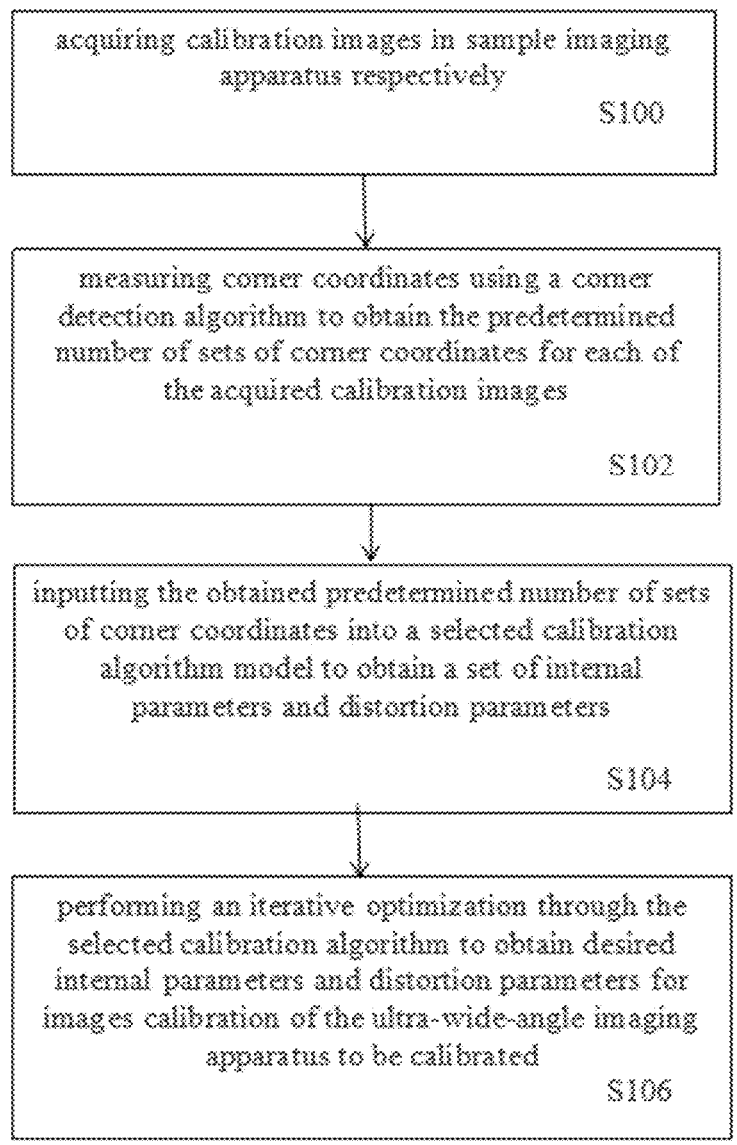
FIG. 1 is a flowchart of distortion calibration method for an ultra-wide-angle imaging apparatus according to an example of the present application.

FIG. 1 is a flowchart of a distortion calibration method for ultra-wide-angle imaging apparatus according to an example of the present disclosure. According to the method, in step S100, calibration images are acquired in each of the sample imaging apparatus. Wherein there are a predetermined number of sample imaging apparatus. A predetermined number can be, for example, 15, 20, etc. The present disclosure does not limit the number of sample imaging apparatus to be employed. Each sample imaging apparatus is defined as an ultra-wide-angle imaging device as a sample. These ultra-wide-angle imaging devices may be devices provided in an imaging or an imaging device such as mobile phones, cameras, tablet computers such as an Pad or the like, or in-vehicle cameras. But an ultra-wide-angle imaging device that is implemented as a stand-alone device is also not excluded from the present disclosure. In this step, for example, 20 mobile phones are selected, and calibration images of the ultra-wide-angle imaging devices of the 20 mobile phones are respectively acquired, so that 20 calibrated images corresponding to the mobile phones are acquired. This step may be handled, for example, by a data processing apparatus independent of the batch of sample imaging devices. The data processing apparatus acquires calibration images from a number of sample imaging devices, respectively.

In step S102, for each calibrated images obtained in step S100, corner coordinates are measured using a corner detection algorithm, thereby obtaining the predetermined number of sets of corner coordinates. For example, after acquiring the calibrated images, the data processing device uses a corner detection algorithm to measure the corner coordinates of each of the 20 calibration images, so as to obtain 20 sets of data, namely, 20 sets of corner coordinates.

In step S104, the obtained predetermined number of sets of corner coordinates are input into the selected calibration algorithm model, thereby obtaining a set of internal parameters and distortion parameters. As an example, the selected calibration algorithm model is the ZHANG's calibration algorithm model. In the case that the selected calibration algorithm model is a ZHANG's calibration algorithm model, the above-mentioned example is continued to be referred to. The data processing apparatus inputs 20 sets of corner coordinates as inputs into ZHANG's calibration algorithm model that has been set in the data processing apparatus, thereby generating a set of internal parameters and distortion parameters.

In step S106, a predetermined number of sets of corner point coordinates obtained in step S102 are taken as an input, a set of internal parameters and distortion parameters obtained in step S104 are taken as an initial value of optimization variables, and the index for evaluating the effect of distortion correction are taken as the minimum, the desired internal parameters and distortion parameters are obtained by iterative optimization of the selected calibration algorithm model. Continuing with the above-mentioned example, the data processing apparatus inputs 20 sets of corner coordinates as inputs into ZHANG's calibration algorithm model to obtain the set of internal parameters and distortion parameters as mentioned in step S104. The set of internal parameters and distortion parameters obtained are taken as the initial values of the optimization variables, and the index for evaluating the effect of distortion correction is taken as the minimum, and then the iterative optimization is performed through the ZHANG's calibration algorithm model. Finally, a set of internal parameters and distortion parameters are output by the model of ZHANG's calibration algorithm. Among them, there is one set of indicators for evaluating the effect of distortion calibration for each of calibration images, so in this example, there are 20 sets of indicators for evaluating the effect of distortion calibration. The desired set of internal parameters and distortion parameters obtained in step S106 are supplied to an ultra-wide-angle imaging apparatus to be calibrated to calibrate an image photographed by the ultra-wide-angle image photographing device. For example, the desired set of internal parameters and distortion parameters obtained are transmitted by the data processing apparatus to the ultra-wide-angle imaging apparatus to be calibrated. It should be noted that the predetermined number of sample imaging devices is only a part of the ultra-wide-angle imaging apparatus to be calibrated.

The data processing devices mentioned above may be laptops, tablet computers, mobile phones, desktop computers, cloud servers or other data processing devices that can communicate with ultra-wide-angle camera devices. Such data processing devices typically have a memory and a processor. The calibration algorithm model is stored, for example, in the memory and is called by the processor during the execution of the method shown in FIG. 1. In some example, the data processing device may not include memory, but use an external storage device instead, such as a cloud-based storage or a mobile storage device.

Figure 2:
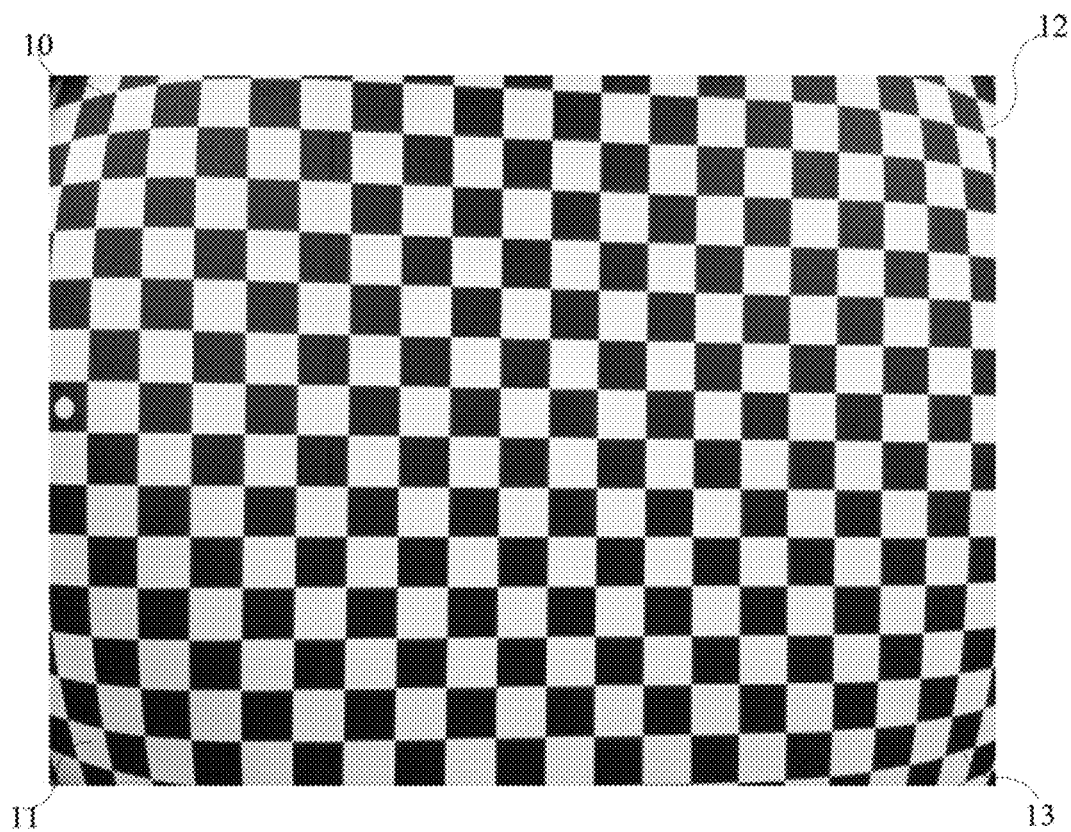
FIG. 2 is a calibration image of an exemplary ultra-wide angle imaging apparatus.

FIG. 2 illustrates a calibration image of an exemplary ultra-wide angle imaging apparatus, i.e., an original checkerboard image. As is shown, there are distortions at the peripheral edges of the image, such as upper left corner distortion 10, upper right corner distortion 12, lower left corner distortion 11 and the lower right corner distortion 13.

The distortion in the ultra-wide-angle imaging apparatus or ultra-wide-angle imaging module is generally caused by the radial distortion caused by the lens shape and the tangential distortion caused by the camera assembly deviation. Assuming that the coordinates of a point in the camera coordinate system are (X, Y, Z), which is projected into the pixel coordinate system as a point (u, v), the two corresponding points satisfy the following calculation formula (1):

$$\begin{cases} x = X/Z \\ y = Y/Z \\ r = \sqrt{x^2 + y^2} \\ x' = x \dfrac{1 + k_1 r^2 + k_2 r^4 + k_3 r^6}{1 + k_4 r^2 + k_5 r^4 + k_6 r^6} + 2 p_1 xy + p_2 (r^2 + 2x^2) \\ y' = y \dfrac{1 + k_1 r^2 + k_2 r^4 + k_3 r^6}{1 + k_4 r^2 + k_5 r^4 + k_6 r^6} + 2 p_2 xy + p_1 (r^2 + 2y^2) \\ u = f_x x' + c_x \\ v = f_y y' + c_y \end{cases} \quad (1)$$

The internal parameters and distortion parameters of the imaging apparatus as unknowns, i.e., $[f_x, f_y, c_x, c_y]$ and $[k_1, k_2, k_3, k_4, k_5, k_6, p_1, p_2]$, may be acquired by calibration. Taking ZHANG's camera calibration method as an example, in the calibration process, the calibration image of the ultra-wide-angle imaging module, namely, the image shown in FIG. 2, is collected first. A number of corner point coordinates are then detected using a corner detection algorithm, such as the number of corner points identified by the bold points in FIG. 3. By using the ZHANG's calibration algorithm based on these corner coordinates, the internal distortion parameters of a single module is obtained. The internal parameters and the distortion parameters is then used to calibrate the distortion of the calibration acquisition images. The calibrated results are obtained as shown in FIG. 4. As can be seen from FIG. 4, the calibrated image restores the "flat" feature of the object in the original image and eliminates image distortion.

Figure 3:
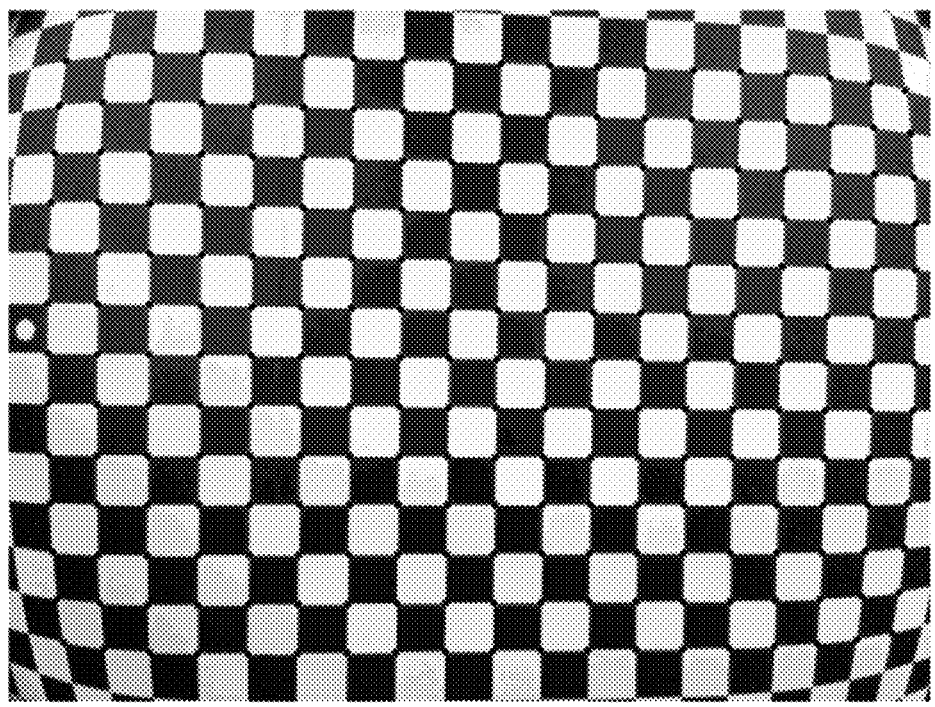
FIG. 3 is an image including corner points in the calibration image as shown in FIG. 2.
Figure 4:
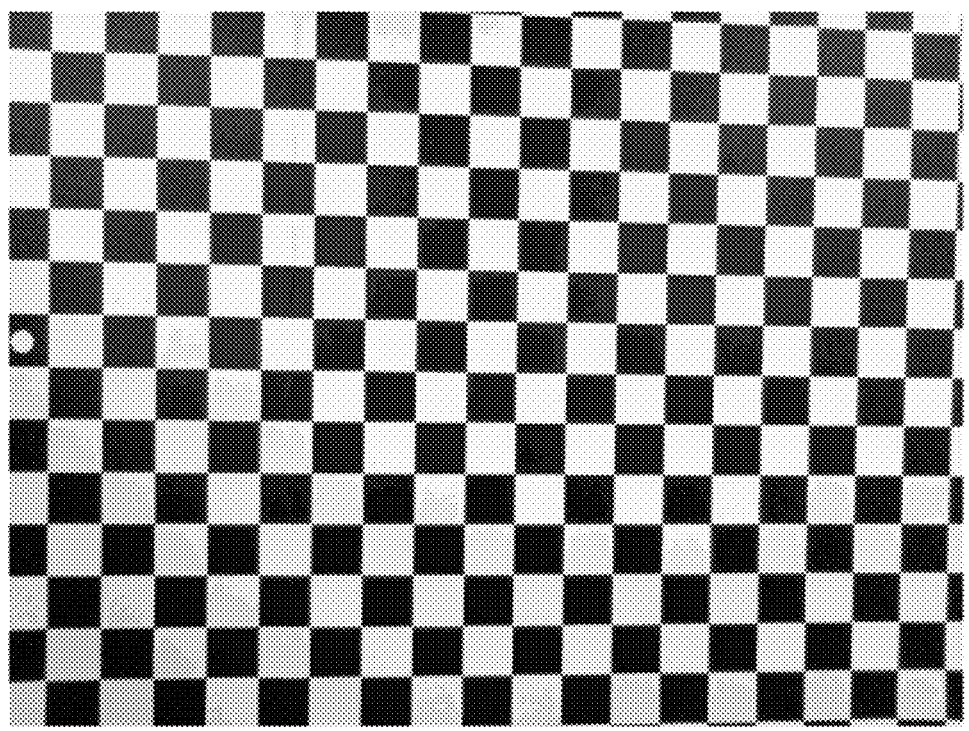
FIG. 4 illustrates an image after distortion calibration.

The conventional distortion correction process for the calibration image is briefly described herein with reference to FIGS. 2 to 3. This process is a known calibration process, in which internal parameters and the distortion parameters are generated for each ultra-wide angle imaging module and are used to calibrate the image.

Continued referring to FIG. 1, a mobile phone is used as a device employing an ultra-wide angle imaging apparatus. For example, 20 mobile phones produced in the same batch are selected as prototypes, and the ultra-wide-angle imaging apparatus in each mobile phone of the 20 mobile phones, that is, the ultra-wide-angle camera module, becomes the sample camera device of the present disclosure. From the 20 sample imaging devices, the calibration images thereof are respectively acquired (step S100), whereby 20 calibration images as shown in FIG. 1 are obtained. For each calibration image, 20 sets of corner coordinates are obtained by measuring the corner coordinates by using a corner detection algorithm (step S102). For each image, the measured corner points are the points indicated by the circles in FIG. 2, and the number and/or position of the corner points of each image may be different. The obtained 20 sets of corner coordinates are used as inputs of the ZHANG's calibration algorithm model, thereby obtaining a set of internal parameters and distortion parameters (step S104). Taking the obtained 20 sets of corner coordinates as input, taking a set of internal parameters and distortion parameters obtained in step S104 as initial values of optimization variables, and taking the index for evaluating the effect of distortion correction as the minimum, the desired internal parameters and distortion parameters are obtained by iterative optimization of the selected calibration algorithm model.

Figure 5:
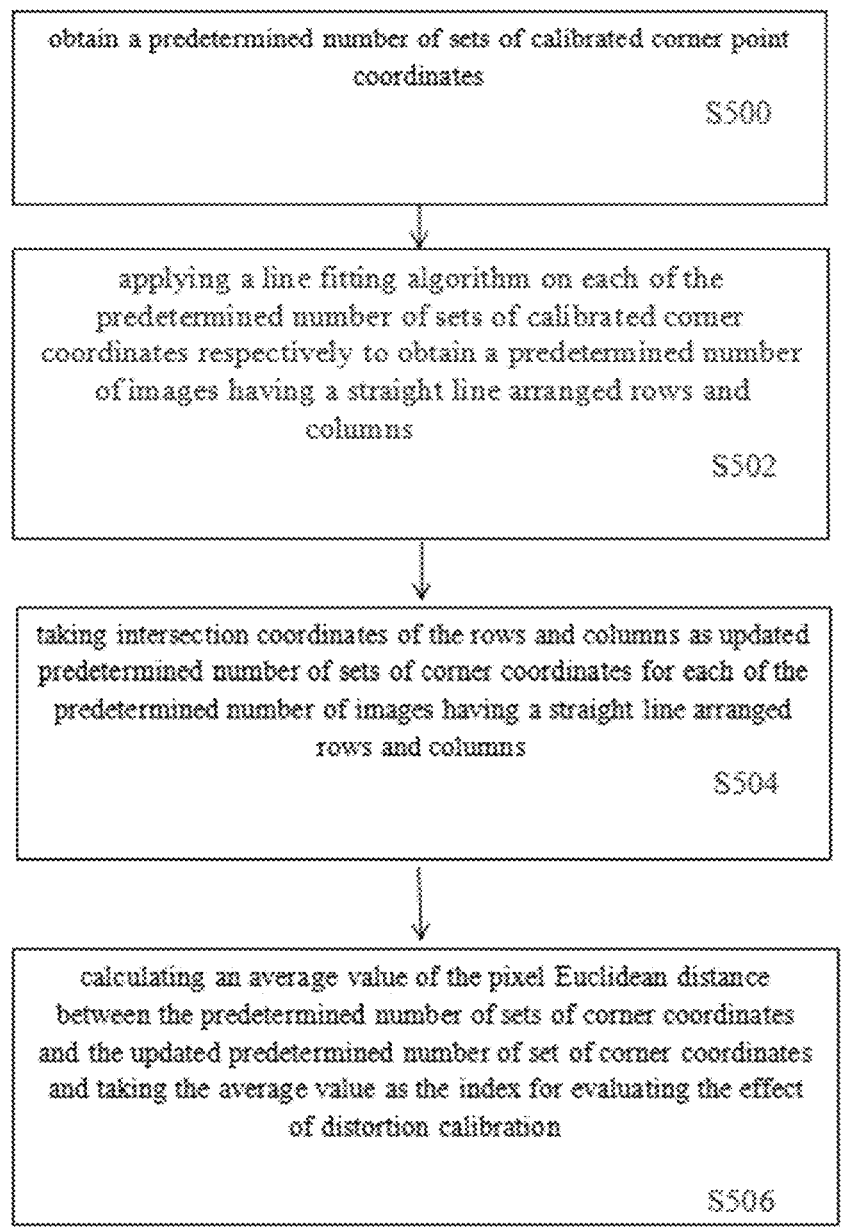
FIG. 5 is a flowchart of obtaining an index for evaluating the distortion calibration effect according to the example of the present disclosure.

Herein, the index obtaining process for evaluating the distortion correction effect will be exemplarily described with reference to FIG. 5. In step 500, each of the predetermined number of set of corner point coordinates is transformed with the set of internal parameters and distortion parameters obtained in step S104 (see FIG. 1), as shown in FIG. 5, to obtain a predetermined number of set of distortion-calibrated corner coordinates. In step S502, a straight line fit algorithm is applied for each of the predetermined number of sets of distortion-calibrated corner coordinates to obtain a predetermined number of images in which rows and columns are arranged in a straight line. In step S504, for each of the images in which the predetermined number of rows and columns are arranged in a straight line, the resulting coordinates of the intersection points of the rows and columns are taken as the updated predetermined number of sets of corner point coordinates. In step S506, an average value of pixel Euclidean distance between a predetermined number of set of corner coordinates and an updated predetermined number of set of corner coordinates is calculated and used as an index for evaluating the effect of distortion calibration.

The mobile phone is still used as the device using the ultra-wide angle imaging apparatus, and the model of ZHANG's calibration algorithm is used as the selected punctuation algorithm model. In addition, similarly, 20 mobile phones produced in the same batch are selected as prototypes, and the ultra-wide-angle camera device in each of the 20 mobile phones, that is, the ultra-wide-angle camera module, becomes the sample imaging apparatus of the present application. Further, the corner coordinates in which the calibration image of one of the sample imaging devices is detected are arranged in M rows and N columns (step S102 in FIG. 1). In step S500, the distortion-calibrated corner coordinate are obtained by transforming the M row and N columns of the corner coordinate arrangement using the set of internal parameters and distortion parameters obtained in step S104 of FIG. 1, namely, the corner coordinate arrangement with distortion calibration. The calibrated corner coordinate arrangement of M rows and N columns obtained in step S500 is fitted by a straight line fitting algorithm (step S502), so that M rows of straight lines and N columns of straight lines intersecting each other are obtained. In step S504, a new corn coordinate of M rows and N columns, namely, an updated corner coordinate, is obtained by using the corn detection algorithm again. For the corner coordinates of M rows and N columns obtained in step S102 of FIG. 1 and the updated corner coordinates obtained in step S504, a pixel Euclidean distance average value of the corresponding corner is calculated (step S506), and this value is used as the evaluation index of distortion calibration. In general, the smaller the average value of the Euclidean distance of the pixel is, the better the distortion calibration effect will be.

Figure 6:
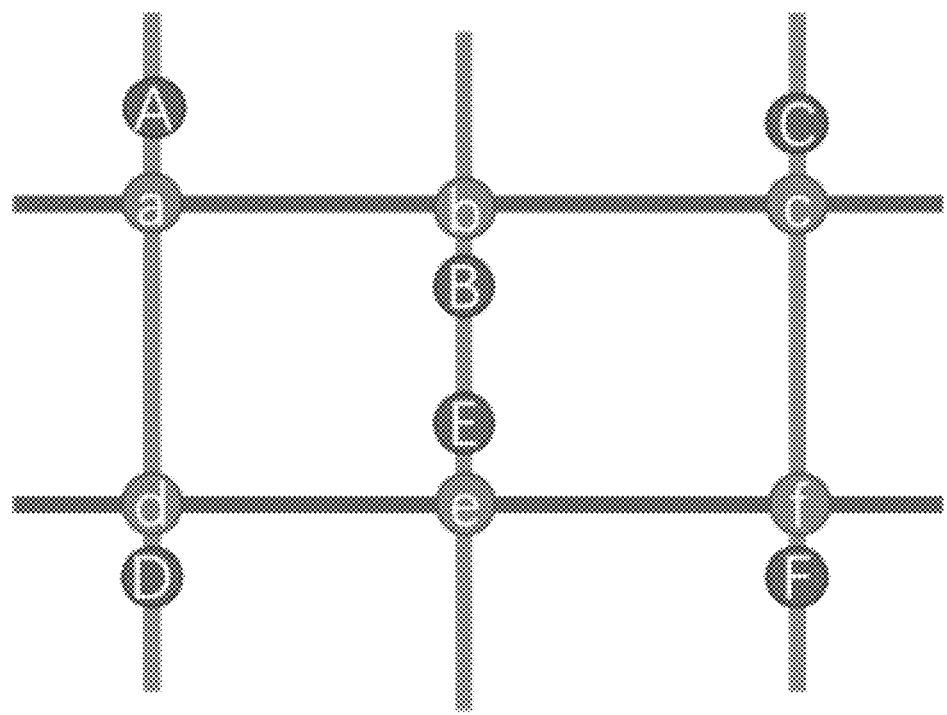
FIG. 6 is a specific example of the implementation of FIG. 5, where M=2, N=3.

Taking M=2, N=3 as an example and taking six points A, B, C, D, E, F in FIG. 2 as an example of corner points, FIG. 6 gives a schematic illustration of the example in which the corner points are distributed in rows 2 and columns 3, namely, the distribution of 2*3. After the processing from step S500 to step S504 shown in FIG. 5, new corner coordinates are obtained, that is, the updated corner arrangement of 2*3, and the updated six corner points are a, b, c, d, e, f, which correspond to six points A, B, C, D, E, F, respectively. The Euclidean distances of a and A, b and B, c and C, d and D, e and E, f and F are calculated respectively, and then the average values of the Euclidean distances to evaluate the effect of distortion calibration are calculated. It should be noted that the index for evaluating the distortion calibration effect obtained in conjunction with the single-mentioned example of M rows and N columns is an index for evaluating the distortion calibration effect for one sample imaging apparatus. For 20 mobile phones or 20 calibration images, there are 20 indicators to evaluate the effect of distortion calibration.

Examples as described in the present disclosure are to detect each of the calibration images of, for example, 20 sample imaging devices as a base, to obtain 20 sets of a predetermined number of sets of corner point coordinates. A predetermined number of 20 sets of corner coordinates are then input into a calibration algorithm model such as ZHANG's calibration algorithm model to obtain a set of internal parameters and distortion parameters. This allows for the overall distortion effect of 20 samples rather than the distortion effect of only one single sample, as compared with the prior art by inputting corner coordinates based on only one calibration image.

Further, compared with the conventional calibration algorithm, a group of internal parameters and distortion parameters obtained based on the corner coordinates of 20 calibration images are taken as initial values of optimization variables, and the index for evaluating the effect of distortion correction is taken as the minimum, 20 groups of focus coordinates detected above are taken as input, and the model of ZHANG's calibration algorithm is used for iterative optimization, the desired internal parameters and distortion parameters are thus obtained. The setting of this step is to optimize the set of internal parameters and distortion parameters calculated in advance, so that the effect of distortion calibration is better. It should be noted that, considering that external parameters are not used in the camera distortion calibration process, the optimization step in the present disclosure does not introduce external parameters compared with the camera external parameters which are considered in the optimization process by the ZHANG's calibration algorithm, the internal parameters and distortion parameters are merely taken as the variables to be optimized in the present disclosure.

Further, the internal parameters and distortion parameters obtained by the example of the present disclosure, since a predetermined number (for example, 20) of samples are considered, that is, the product to be calibrated is considered more generally, which makes the final internal parameters and distortion parameters applicable to the whole batch of the sample imaging device, and greatly improves the calibration efficiency.

Figure 7:
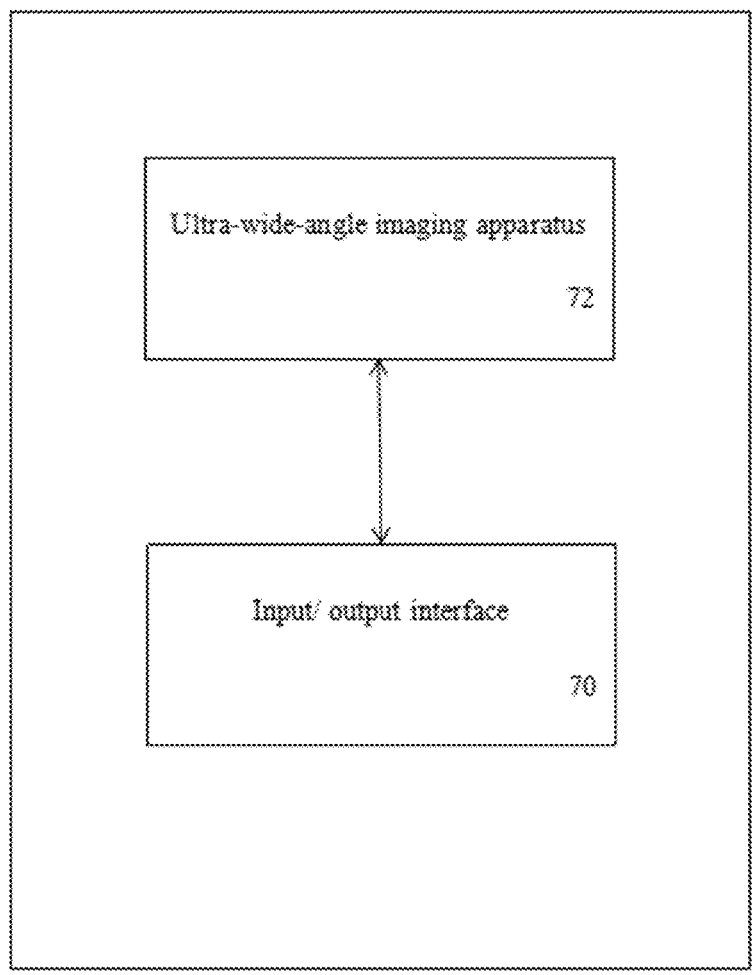
FIG. 7 is a structural diagram of a photographing device according to an embodiment of the present disclosure.

According to an example of the present application, there is also provided a photographing device including an ultra-wide-angle imaging apparatus. FIG. 7 is a structural diagram of an exemplary photographing device. The photographing device includes an input/output interface (70) and an ultra-wide-angle imaging apparatus (72). It should be noted that the photographing devices may also include more devices, and only the components related to the present disclosure are shown herein. As shown, the ultra-wide-angle imaging apparatus (72) may receive desired internal parameters and distortion parameters via the input/output interface (70). Herein, the desired internal parameters and distortion parameters are obtained by the method as described above in connection with FIG. 1 and/or FIG. 5. The ultra-wide-angle imaging apparatus (72) calibrates the distortion parameters based on the received desired internal parameters and the distortion parameters. The photographing device may be one of a mobile phone, a tablet computer such as iPad, a camera, an in-vehicle image photographing device, or a combination thereof. The in-vehicle image photographing device can be, for example, an in-vehicle camera.

Figure 8:
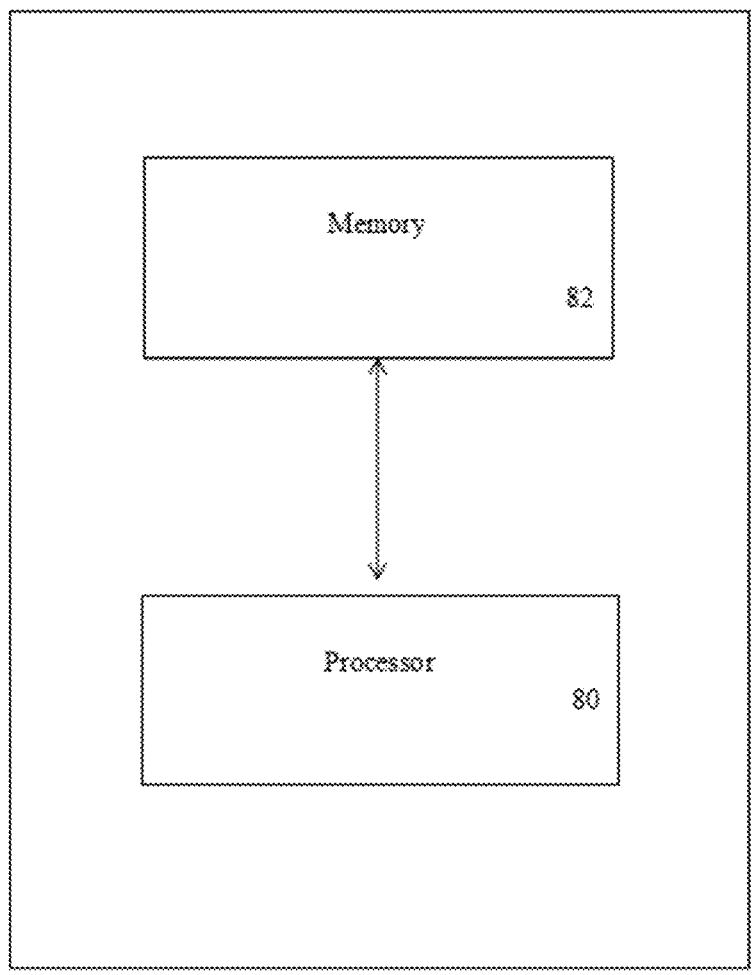
FIG. 8 is a schematic diagram showing a structure of a calibration apparatus for an ultra-wide-angle imaging apparatus according to an embodiment of the present application.

According to the example of the present disclosure, there is also provided a calibration device for an ultra-wide-angle imaging apparatus, as shown in FIG. 8. The calibration device includes a processor (80) and a memory (82). The instructions are stored in the memory (82). The processor (80) may execute the instructions in the memory (82) and, during the executing of the instructions, may implement the ultra-wide-angle camera device distortion calibration methods described above in connection with the examples. The calibration device of ultra-wide-angle imaging apparatus may be implemented as a separate component. The component may communicate with the device to be calibrated to obtain the final internal parameters and distortion parameters by means of an instruction implemented method and transmit them to the device to be calibrated. The calibration device of ultra-wide-angle imaging apparatus may also be implemented in an existing computer device, where the computer device should be broadly understood as a device having a data processing capability such as a computer, a mobile phone, a tablet, or the like.

Figure 9:
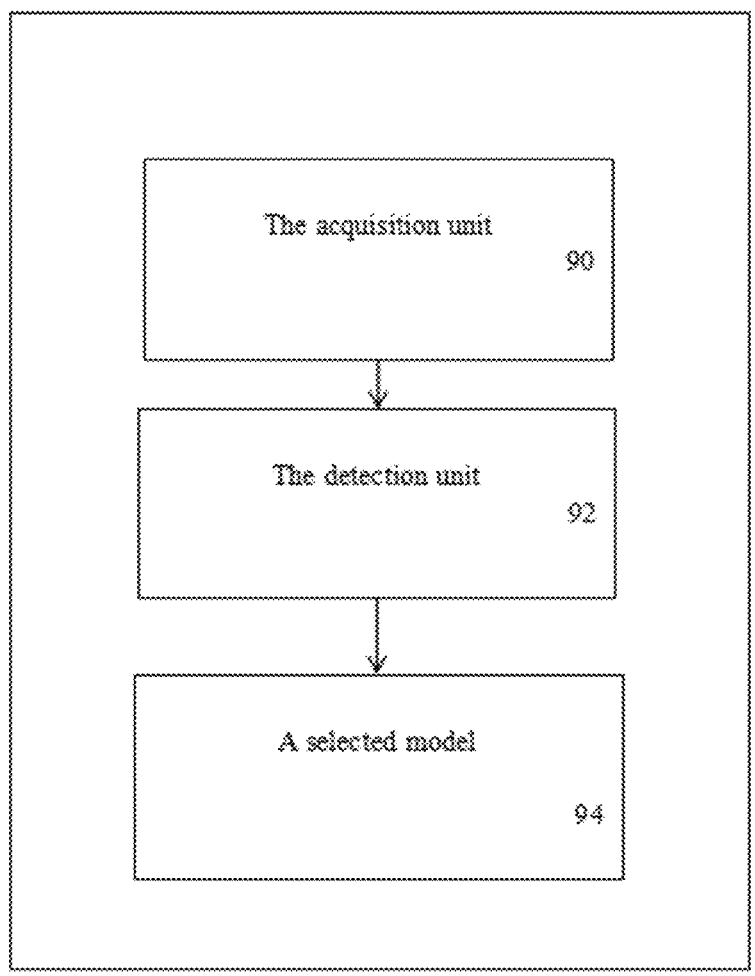
FIG. 9 is a schematic diagram showing a structure of a distortion calibration system for an ultra-wide-angle imaging apparatus according to an embodiment of the present disclosure.

According to an example of the present disclosure, a distortion calibration system for an ultra-wide-angle imaging apparatus is also provided. FIG. 9 is a schematic diagram showing the structure of the distortion calibration system for an ultra-wide-angle imaging apparatus. As shown, the distortion calibration system for an ultra-wide-angle imaging apparatus includes an acquisition unit (90), a detection unit (92), and a selected model (94). The acquisition unit (90) is configured to acquire the calibration images in each of the sample imaging apparatus, wherein there are a predetermined number of sample imaging apparatus, respectively. The detection unit (92) is configured to measure corner coordinates using a corner detection algorithm for each calibration images to obtain the predetermined number of sets of corner coordinates. The selected model (94) is configured to receive the predetermined number of sets of corner point coordinates from the detection unit and output a set of internal parameters and distortion parameters. The selected model (94) is also configured to take the obtained predetermined number of sets of corner point coordinates as input, taking the obtained set of internal parameters and distortion parameters as initial values of optimization variables, and take the index for evaluating the effect of distortion correction as the minimum to perform iterative optimization through the selected calibration algorithm, the desired internal parameters and distortion parameters are thus obtained.

According to some examples of the present disclosure, the selected model (94) is a ZHANG's calibration algorithm model.

According to some examples of the present disclosure, the selected model is further configured to perform the method shown in FIG. 5 to obtain indicators that evaluates the effectiveness of distortion calibration.

The distortion calibration system of an ultra-wide-angle imaging apparatus shown in FIG. 9 may perform, for example, the method described above in connection with FIG. 1. While in other examples, the methods described in connection with FIGS. 1 and 5 may be implemented.

In some cases, it is also possible to use a value set in advance, instead of using the method shown in FIG. 5, for example, to obtain an index for evaluating the distortion calibration effect.

In summary, each example of the present disclosure is based on the corner coordinate arrangement of a number of samples as the input item of the calibration algorithm model, so as to obtain a group of internal parameters and distortion parameters applicable to the whole batch of products where the samples are located. The efficiency of the calibration parameter acquisition is improved. In addition, according to the example of the present disclosure, a preliminary set of internal parameters and distortion parameters are optimized again, thereby obtaining internal parameters and distortion parameters that provide a better correction effect, thereby improving the correction effect of the photographing device to be corrected.

The above described embodiments represent only a few embodiments of the present disclosure, and the description thereof is more specific and detailed, but it is not to be construed as limiting the scope of the invention patent. It should be noted that, for those skilled in the art, a number of modifications and improvements can be made without departing from the concept of the present invention, all of which are within the scope of protection of the present invention. Therefore, the scope of protection of the invention patent should be subject to the attached claims.

What is claimed is:

1. A method for a distortion calibration of ultra-wide angle imaging apparatus, comprising:
   acquiring calibration images in sample imaging apparatus respectively, wherein the number of the sample imaging devices is a predetermined number;
   measuring corner coordinates using a corner detection algorithm to obtain the predetermined number of sets of corner coordinates for each of the acquired calibration images;
   inputting the obtained predetermined number of sets of corner coordinates into a selected calibration algorithm model to obtain a set of internal parameters and distortion parameters; and
   performing an iterative optimization through the selected calibration algorithm to obtain desired internal parameters and distortion parameters for images calibration of the ultra-wide-angle imaging apparatus to be calibrated, by:
   taking the obtained predetermined number of sets of corner coordinates as an input,
   taking the obtained set of internal parameters and distortion parameters as initial values of optimization variables, and
   taking an index for evaluating an effect of distortion correction as the minimum.

2. The method for a distortion calibration of ultra-wide angle imaging apparatus of claim 1, wherein the selected calibration algorithm model is a ZHANG's calibration algorithm model.

3. The method for a distortion calibration of ultra-wide angle imaging apparatus of claim 1, wherein the index for evaluating the distortion calibration effect is obtained through:
   transforming each of the predetermined number of sets of corner coordinates with the obtained set of internal parameters and distortion parameters to obtain a predetermined number of sets of calibrated corner point coordinates;
   applying a line fitting algorithm on each of the predetermined number of sets of calibrated corner coordinates respectively to obtain a predetermined number of images having a straight line arranged rows and columns;
   taking intersection coordinates of the rows and columns as updated predetermined number of sets of corner coordinates for each of the predetermined number of images having a straight line arranged rows and columns; and calculating an average value of the pixel Euclidean distance between the predetermined number of sets of corner coordinates and the updated predetermined number of set of corner coordinates and taking the average value as the index for evaluating the effect of distortion calibration.

4. A photographing device including an ultra-wide angle imaging apparatus, the ultra-wide angle imaging apparatus is configured to calibrate photographed images with desired internal references and distortion parameters; wherein the desired internal parameters and distortion parameters are obtained through:
- obtaining calibration images in each of sample imaging apparatus respectively, wherein the sample imaging apparatus and the ultra-wide angle imaging apparatus are same batch of products, and the number of the sample imaging apparatus is a predetermined number;
- measuring corner coordinates using a corner detection algorithm to obtain a predetermined number of sets of corner coordinates for each of the obtained calibration images;
- inputting the obtained predetermined number of sets of corner coordinates into a selected calibration algorithm model to obtain a set of internal parameters and distortion parameters; and
- performing an iterative optimization through the selected calibration algorithm to obtain desired internal parameters and distortion parameters for images calibration of the ultra-wide-angle imaging apparatus to be calibrated, by:
- taking the obtained predetermined number of sets of corner coordinates as an input,
- taking the obtained set of internal parameters and distortion parameters as initial values of optimization variables, and
- taking an index for evaluating an effect of distortion correction as the minimum.

5. The photographing device including an ultra-wide angle imaging apparatus of claim 4, wherein the selected calibration algorithm model is a ZHANG's calibration algorithm model and the index for evaluating the distortion calibration effect is obtained through:
- transforming each of the predetermined number of sets of corner coordinates with the obtained set of internal parameters and distortion parameters to obtain a predetermined number of sets of calibrated corner point coordinates;
- applying a line fitting algorithm on each of the predetermined number of sets of calibrated corner coordinates respectively to obtain a predetermined number of images having a straight line arranged rows and columns;
- taking intersection coordinates of the rows and columns as updated predetermined number of sets of corner coordinates for each of the predetermined number of images having a straight line arranged rows and columns; and
- calculating an average value of the pixel Euclidean distance between the predetermined number of sets of corner coordinates and the updated predetermined number of set of corner coordinates and taking the average value as the index for evaluating the effect of distortion calibration.

6. A distortion calibration device of ultra-wide angle imaging apparatus comprising a processor and a memory, wherein instructions are stored in the memory; and the method of claim 1 is implemented when the instructions are executed by the processor.

7. A distortion calibration system of ultra-wide angle imaging apparatus, comprising:
- an acquisition unit configured to acquire calibration images in each of sample imaging apparatus, wherein the sample imaging apparatus have predetermined number;
- a detection unit for measuring corner coordinates using a corner detection algorithm for each acquired calibration images to obtain a predetermined number of sets of corner coordinates; and
- a selected model configured to:
- receive the obtained predetermined number of sets of corner point coordinates from the detection unit and output a set of internal parameters and distortion parameters;
- perform an iterative optimization through the selected calibration algorithm to obtain desired internal parameters and distortion parameters for images calibration of the ultra-wide-angle imaging apparatus to be calibrated, by:
- taking the obtained predetermined number of sets of corner coordinates as an input,
- taking the obtained set of internal parameters and distortion parameters as initial values of optimization variables, and
- taking an index for evaluating an effect of distortion correction as the minimum.

8. The distortion calibration system of ultra-wide angle imaging apparatus of claim 7, wherein the selected calibration algorithm model is a ZHANG's calibration algorithm model.

9. The distortion calibration system of ultra-wide angle imaging apparatus of claim 7, characterized in that the selected model is configured to:
- transform each of the predetermined number of sets of corner coordinates with the obtained set of internal parameters and distortion parameters to obtain a predetermined number of sets of calibrated corner point coordinates;
- apply a line fitting algorithm on each of the predetermined number of sets of calibrated corner coordinates respectively to obtain a predetermined number of images having a straight line arranged rows and columns;
- take intersection coordinates of the rows and columns as updated predetermined number of sets of corner coordinates for each of the predetermined number of images having a straight line arranged rows and columns; and
- calculate an average value of the pixel Euclidean distance between the predetermined number of sets of corner coordinates and the updated predetermined number of set of corner coordinates and taking the average value as the index for evaluating the effect of distortion calibration.

* * * * *